US012135874B2

(12) United States Patent
Rao (10) Patent No.: US 12,135,874 B2
(45) Date of Patent: Nov. 5, 2024

(54) LIVE FIRMWARE UPDATE OF FLASH MEMORY

(71) Applicant: Texas Instruments Incorporated, Dallas, TX (US)

(72) Inventor: Sira Parasurama Rao, Richmond, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 241 days.

(21) Appl. No.: 17/702,561

(22) Filed: Mar. 23, 2022

(65) Prior Publication Data

US 2023/0315284 A1    Oct. 5, 2023

(51) Int. Cl.
*G06F 8/654* (2018.01)
*G06F 3/06* (2006.01)
*G06F 8/656* (2018.01)

(52) U.S. Cl.
CPC .......... *G06F 3/0604* (2013.01); *G06F 3/0632* (2013.01); *G06F 3/0659* (2013.01); *G06F 3/0679* (2013.01); *G06F 8/654* (2018.02); *G06F 8/656* (2018.02)

(58) Field of Classification Search
CPC ........ G06F 8/654; G06F 8/656; G06F 3/0604; G06F 3/0632; G06F 3/0659; G06F 3/0679
See application file for complete search history.

(56) References Cited

U.S. PATENT DOCUMENTS

| 7,962,736 B1 | 6/2011 | Polyudov |
| 2004/0199693 A1* | 10/2004 | Tseng ............... G06F 9/3802 712/E9.027 |
| 2011/0320794 A1* | 12/2011 | Yang .................. G06F 11/1433 713/1 |

(Continued)

OTHER PUBLICATIONS

Gab Seon Rho er al., "Implementation of a RISC microprocessor for programmable logic controllers", [Onlien], pp. 599-608, [Retrieved from Internet on Jan. 4, 2024], <https://www.sciencedirect.com/science/article/pii/0141933196841615> (Year: 1995).*

(Continued)

*Primary Examiner* — Ziaul A Chowdhury
(74) *Attorney, Agent, or Firm* — Mandy Barsilai Fernandez; Frank D. Cimino (57) ABSTRACT

In described examples, a flash memory bank includes application and bootloader portions. The application portion stores first instructions for performing an interrupt service routine (ISR). The bootloader portion stores second instructions for: causing the flash memory bank to receive new first instructions for performing the ISR and write the new first instructions to replace old first instructions, and executing the new first instructions. The new first instructions execute the following steps in order. First, while maintaining an interrupt response, initializing variables specified by the new first instructions and not specified by the old first instructions, and not changing variables specified by the old first instructions. Second, after determining there is no interrupt response in process, disabling the interrupt response and proceeding to a third step. Third, initializing a stack, updating an interrupt vector, and updating a function pointer. Fourth, re-enabling the interrupt response.

20 Claims, 5 Drawing Sheets

(56) References Cited

U.S. PATENT DOCUMENTS

| | | |
|---|---|---|
| 2016/0266894 A1 | 9/2016 | Panicker |
| 2020/0073584 A1 | 3/2020 | Tsuchiya |
| 2021/0011706 A1 | 1/2021 | Nachimuthu et al. |
| 2022/0283892 A1* | 9/2022 | Polasa ................. G06F 11/0721 |
| 2023/0185581 A1* | 6/2023 | Huang .................... G06F 9/445 |
| | | 718/102 |

OTHER PUBLICATIONS

"Serial Port", Wikipedia, https://en.wikipedia.org/w/index.php?title=Serial_port&oldid=1073577424, Feb. 23, 2022, 10 pgs.

* cited by examiner

LIVE FIRMWARE UPDATE OF FLASH MEMORY

TECHNICAL FIELD

This application relates generally to firmware updating, and more particularly to live firmware updating in flash memory of software for handling interrupt service requests.

BACKGROUND

Flash memory is an electronic non-volatile computer storage medium that can be electrically erased and written. This means that flash memory can store software so that the software is promptly available for execution after a power on reset (or other event that clears volatile memory) of a device that includes the flash memory, such as an integrated circuit (IC). In some examples, an individual bank of a flash memory cannot both be read and written at the same time, such as during a same clock cycle.

SUMMARY

In described examples, a flash memory bank includes application and bootloader portions. The application portion stores first instructions for performing an interrupt service routine (ISR). The bootloader portion stores second instructions for: causing the flash memory bank to receive new first instructions for performing the ISR and write the new first instructions to replace old first instructions, and executing the new first instructions. The new first instructions execute the following steps in order. First, while maintaining an interrupt response, initializing variables specified by the new first instructions and not specified by the old first instructions, and not changing variables specified by the old first instructions. Second, after determining there is no interrupt response in process, disabling the interrupt response and proceeding to a third step. Third, initializing a stack, updating an interrupt vector, and updating a function pointer. Fourth, re-enabling the interrupt response.

DETAILED DESCRIPTION

Figure 1:
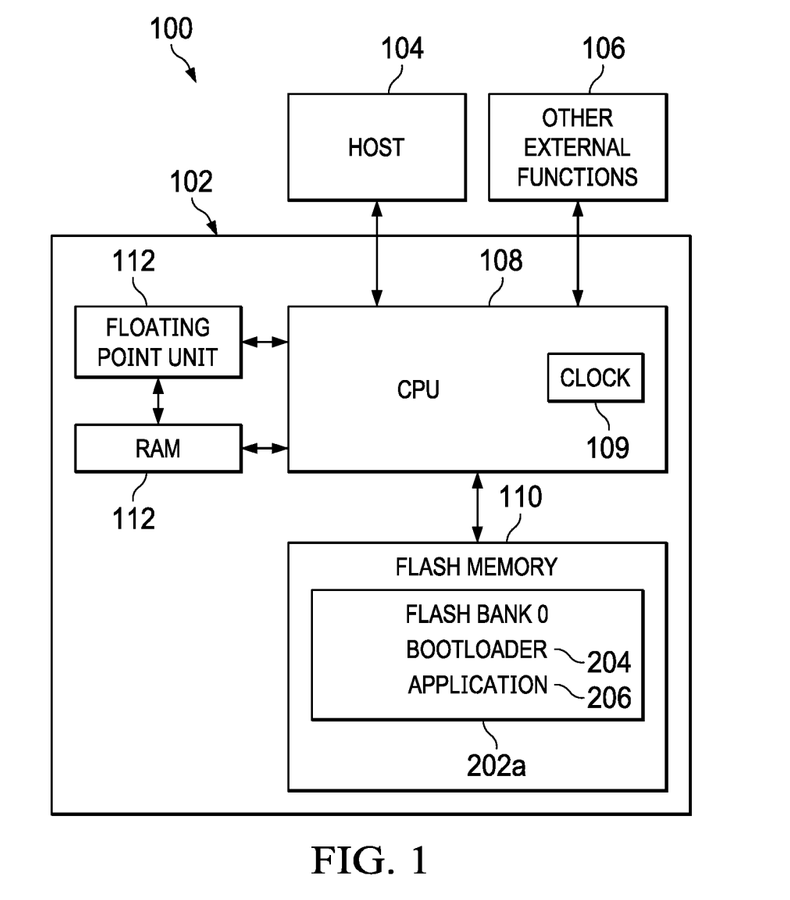
FIG. 1 shows a functional block diagram of an example processing system.
Figure 2:
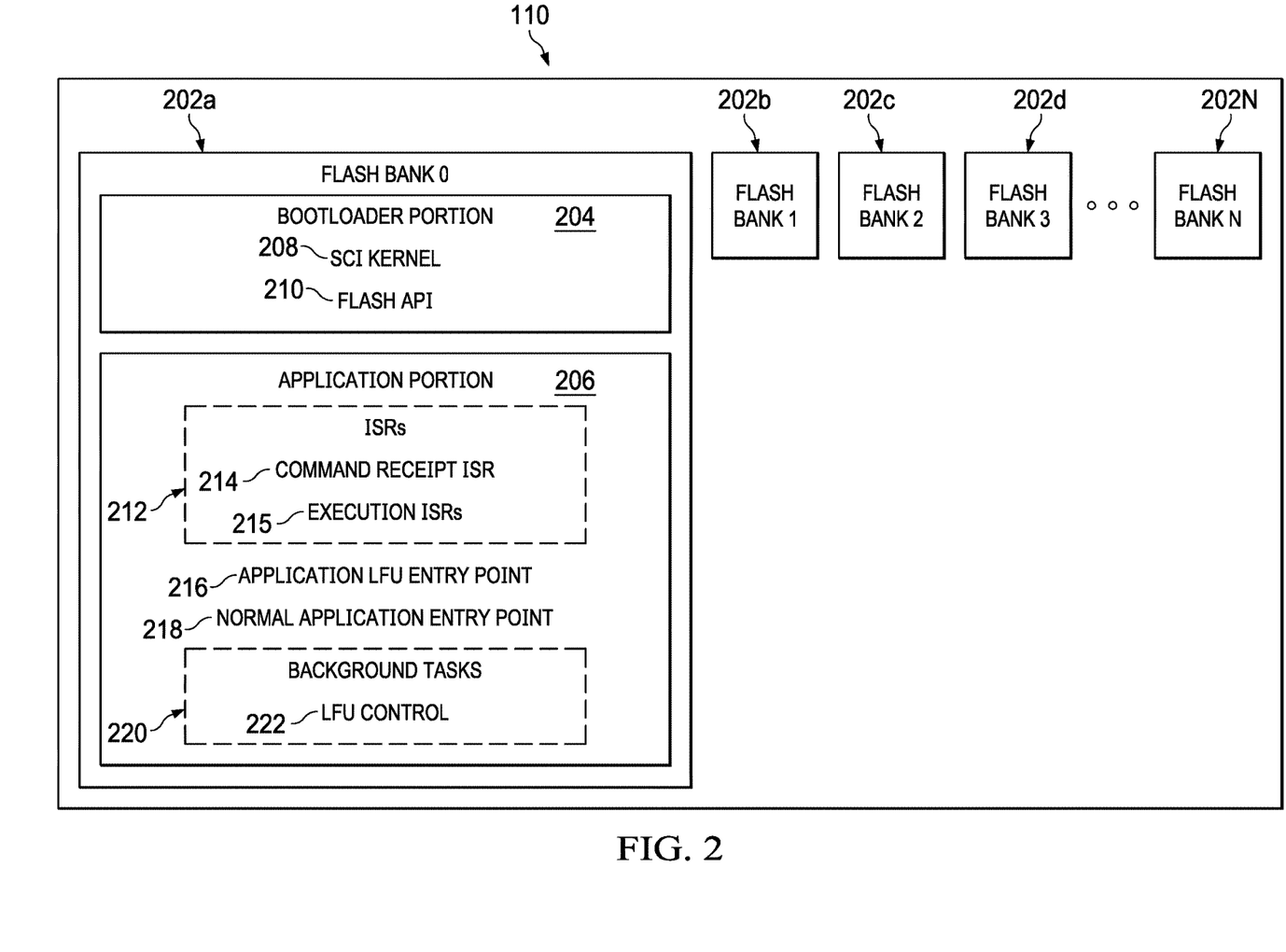
FIG. 2 shows a functional block diagram of an example flash memory as described with respect to the processing system of FIG. 1.

FIG. 1 shows a functional block diagram of an example processing system 100. An integrated circuit (IC) 102 is communicatively connected to a host 104 and to other external functions 106. (Other external functions 106 can include, for example, other ICs, external memory, or other peripheral devices.) The host 104 can be, for example, an IC that includes a microcontroller or processor. The host 104 and the other external functions 106 are communicatively connected to a central processing unit (CPU) 108 within the IC 102 that includes a clock 109. The CPU 108 is connected to a flash memory 110, a random access memory (RAM) 112, and a floating point unit 114. The flash memory 110 includes one or more flash memory banks 202 (FIG. 2).

Flash bank 0 202a includes a bootloader portion 204 and an application portion 206. The bootloader portion 204 includes software for controlling a live firmware update (LFU). The application portion 206 stores a command receipt interrupt service routine (ISR) 214 to receive commands, including interrupt-related and LFU-related commands. The application portion 206 also includes a command receipt ISR 214 for handling requests corresponding to received interrupt commands and one or more execution ISRs 215 for performing interrupt response actions, as well as other software (further described with respect to FIG. 2). The entirety of the code stored in the application portion 206 is referred to as an application image.

During normal operation, the CPU 108 generates an interrupt in response to a message or other event that requests a time-sensitive response. This message or other event can be generated in a functional block of the IC 102 (such as the CPU 108 or the floating point unit 114), or by the host 104 or the other external functions 106. The interrupt serves as a request for the CPU 108 to interrupt currently executing code, and to promptly execute software addressing the event that caused the interrupt. If the request is accepted, the CPU 108 suspends and saves its currently executing software context and begins a process to execute an appropriate ISR to deal with the causative event. (A software context is a relatively minimal set of data, used by a software task, that if saved will allow the task to be interrupted and, later, resumed based on the saved data.) Different ISRs, stored in different portions of the flash memory 110 (such as flash banks 0, 1, or 2 202a, 202b, or 202c or other flash banks) or in RAM 112 (or other memory), can be used to respond to different types of interrupts. Different types of interrupts can take different amounts of time (different numbers of clock cycles) to process. Interrupts are used to service various types of periodic events such as hardware timers, voltage regulation, motor control, digital power control, data transfer, communication interfaces, user input devices, and other time-sensitive events.

Firmware is software residing in non-volatile memory, such as the flash memory 110. Firmware can be updated to, for example, address bugs, add new features, or improve performance. A system using firmware for interrupt response can be halted, rebooted, or continuously operated during firmware update. In some examples in which a break in interrupt response can compromise performance of critical services, such as in voltage regulation or metering for a server power supply, continuous system operation and continuous interrupt response are preferred. A firmware update performed without system halt or reboot is referred to as an LFU. Flash bank 0 202a as described in FIG. 2, and LFU as described in FIGS. 3 and 4, enable LFU to be performed using a single flash bank 202 without system halt or reboot, and without requiring careful timing of LFU operations for the bulk of the LFU process.

FIG. 2 shows a functional block diagram of an example flash memory 110 as described with respect to the processing system 100 of FIG. 1. The flash memory 110 includes multiple flash banks 202, different ones of which are distinguished as flash bank 0 202a, flash bank 1 202b, flash bank 2 202c, flash bank 3 202d, . . . , through a number Nth flash bank 202 referred to as flash bank N 202N. Flash bank 0 202a (which, as previously described, is non-volatile memory) includes various software, which can be classified into a bootloader portion 204 and an application portion 206. Flash bank 0 202a spans a flash memory 110 address range, for example, 0x80000 to 0x8FFFF.

The bootloader portion 204 includes a serial communication interface (SCI) kernel 208 and a flash memory application programming interface (flash API) 210. The SCI kernel 208 receives process control from the application portion 206 during LFU, causes a new application image received from the host 104 via the CPU 108 to be copied into the application portion 206, and returns process control to the application portion 206 to facilitate completion of LFU and return to normal interrupt response.

The application portion 206 includes ISRs 212, an application LFU entry point 216, a normal application entry point 218 (where execution of application components begins during normal operation), and background tasks 220. The ISRs include the command receipt ISR 214 and one or more execution ISRs 215 (real-time control ISRs, such as a voltage control ISR). The background tasks 220 include an LFU control 222. The command receipt ISR 214 receives and logs (for example, by setting a corresponding flag) commands from the CPU 108, including interrupt commands, as well as LFU commands received by flash bank 0 202a from the host 104 via the CPU 108. The LFU control 222 is a background task function that controls LFU process flow while LFU processes are executed from the application portion 206. This includes determining whether the command receipt ISR 214 has set a flag indicating that the CPU 108 has received a command to start LFU of the application portion 206, and passing control to the bootloader portion 204 after determining the LFU command has been received.

The application LFU entry point 216 is executed during initialization of the application image in the application portion 206. Accordingly, the application LFU entry point 216 is executed after a power reset of the IC 102, and is executed during LFU after an LFU process copies a new application image into the application portion 206. The application LFU entry point 216 copies into RAM 112 ISRs in the application portion 206 that need to be available to execute in response to an interrupt event, as well as the flash API 210 (unless the flash API 210 is in read only memory (ROM)), portions of the SCI kernel 208 associated with the flash API 210, and other contents of the bootloader portion 204 and the application portion 206 necessary for proper functioning of ISRs and LFU processes during LFU (such as constants used by ISRs that are stored in the application portion 206). This means that ISRs are available for execution from RAM 112 during normal execution and during LFU, avoiding interrupt response disruption. The SCI kernel portions 208 and flash API 210 are copied into RAM 112 because flash bank 0 202a cannot be both read and written at the same time (flash bank 0 202a cannot read from the bootloader portion 204 while writing to the application portion 206). Note that when the application LFU entry point 216 is executed after the LFU process copies the new application image into the application portion 206, the ISRs and other components corresponding to the new application image (rather than the old, pre-LFU application image) are copied into RAM 112.

The application LFU entry point 216 also performs variable initialization while interrupt response remains enabled (interrupt response is maintained), then causes interrupt response to be disabled if no interrupt event is being addressed, followed by performing stack initialization, interrupt vector updating, and function pointer updating, and then causes interrupt handling to be re-enabled. Variables used by ISRs are initialized in RAM 112. Variable initialization causes new variables specified by a new application image to be initialized within RAM 112, without resetting or otherwise affecting variables used by an old application image (including variables used by both the old and new application images). Performing variable initialization without affecting variables used by the old application image facilitates interrupt response continuing during LFU without disruption.

The stack that is initialized is the software stack in RAM 112 that is used to save and restore context after functions are called or after interrupts occur. Stack initialization sets a pointer to the stack to point to the top of the stack. An interrupt vector is the memory address of an ISR, such as command receipt ISR 214 and execution ISR 215. After an interrupt occurs, the CPU 108 looks up a location in a vector table corresponding to that particular interrupt to find the memory address of the particular ISR corresponding to that particular interrupt, and begins execution at the ISR's memory address, thus executing the particular ISR. Interrupt vectors and function pointers are updated during LFU because an ISR or function address in flash bank 0 202a can change as the corresponding application image is changed.

The application LFU entry point 216 is not necessarily located at the start of the memory range of flash bank 0 202a. For example, the application LFU entry point 216 can be located at address 0x8EFF0 within the flash memory 110, in a flash bank 0 202a that begins at address 0x80000.

In some examples, ISRs and other components in RAM 112 corresponding to an old application image remain in RAM 112 after LFU completes (in some examples, this storage continues after the new application executes). A later execution of the application LFU entry point 216, corresponding to a later LFU process, can overwrite these legacy ISR- and LFU-related components (including variables), with similarly selected components corresponding to the new application image of the later LFU process (the new application image of the previous LFU process becomes an old application image with respect to the later LFU process).

Figure 3:
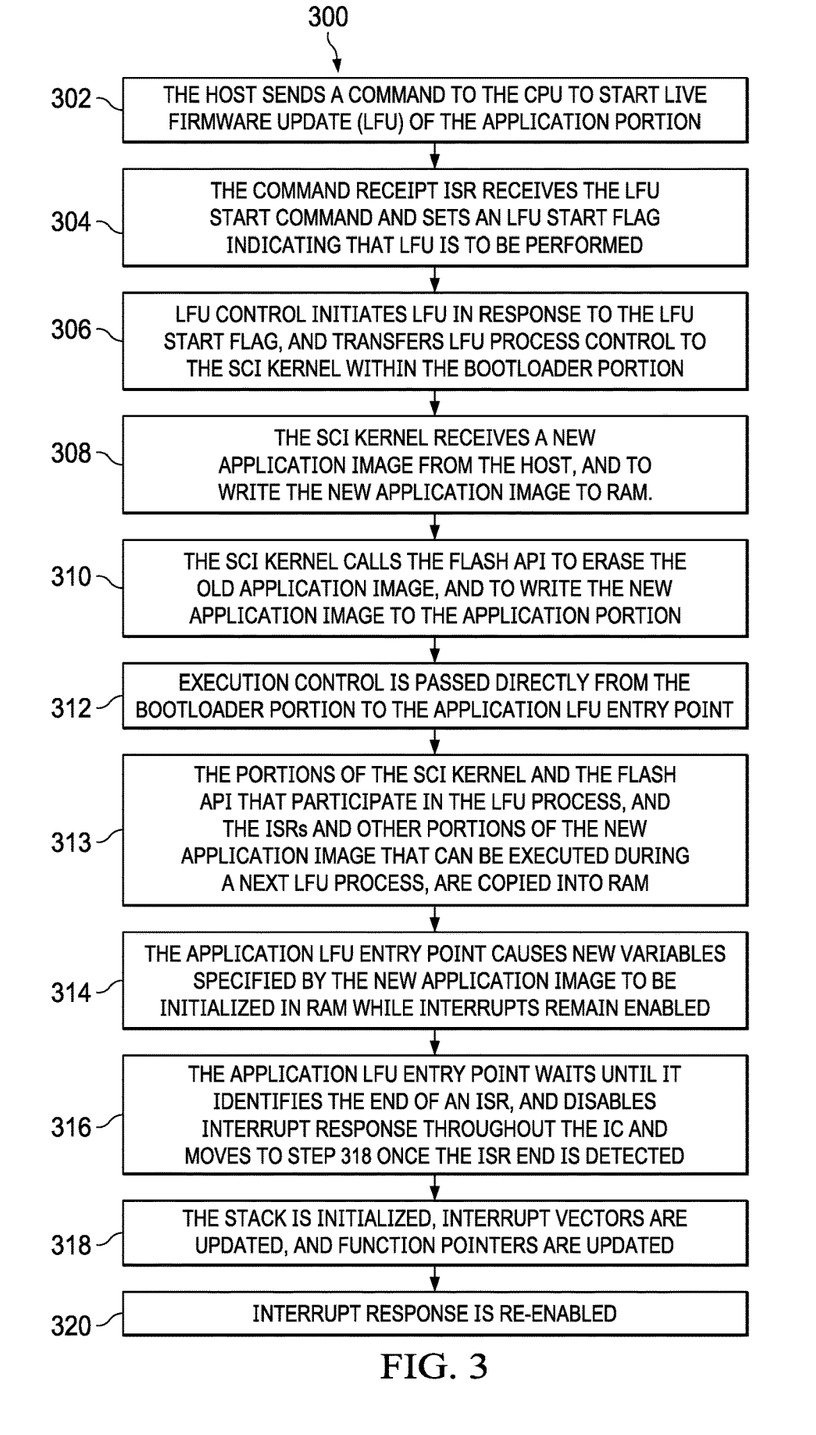
FIG. 3 shows an example live firmware update (LFU) process for LFU of an application of a flash bank 0 as described with respect to FIG. 2.
Figure 4:
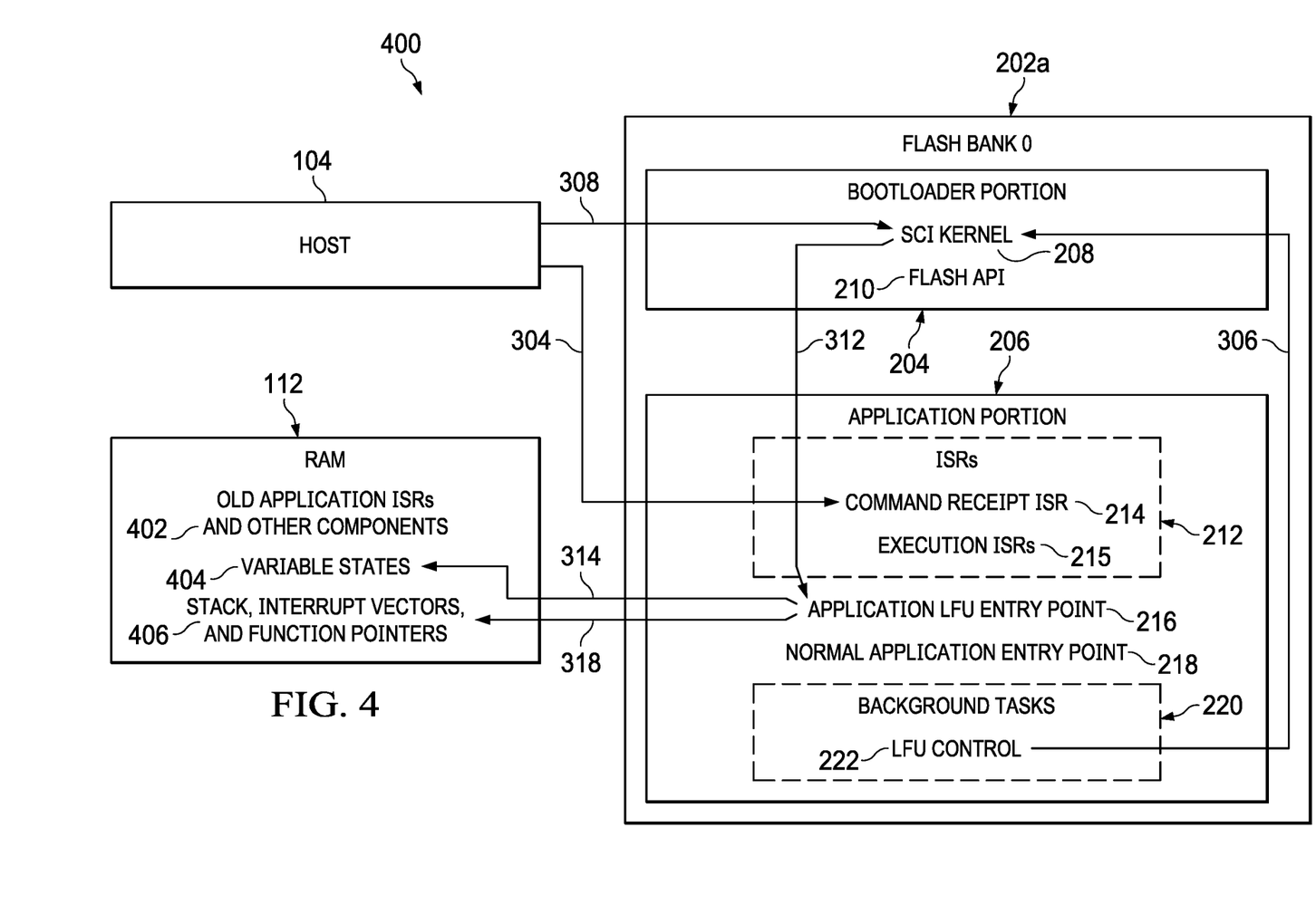
FIG. 4 illustrates an example process flow with respect to an IC as described with respect to FIG. 1, including a flash bank 0 as described with respect to FIG. 2.

FIG. 3 shows an example LFU process 300 for LFU of an application portion 206 of a flash bank 0 202a as described with respect to FIG. 2. FIG. 4 illustrates an example process flow 400 of the LFU process 300 with respect to an IC 102 as described with respect to FIG. 1, including a flash bank 0 202 as described with respect to FIG. 2. In FIG. 4, instruction and data transfers are mediated by the CPU 108, but are shown as being direct communications for clarity.

At the beginning of the LFU process 300, the application portion 206 stored in flash bank 0 202a is an old application image, and the various ISRs and associated execution products (such as variables) required to maintain interrupt response according to the old application image are present in RAM 112 as a result of execution of the application LFU entry point 216, either during device reset (a full power reset of the IC 102) or during a previous LFU. These are illustrated as old application ISRs and related components 402. In step 302, the host 104 sends a command to the CPU 108 to start LFU of the application portion 206; accordingly, the host 104 specifies that the application portion 206 within flash bank 0 202a (as opposed to a different flash bank 202 of the flash memory 200) is to be updated using LFU. In step 304, the command receipt ISR 214 receives the LFU command and sets an LFU flag (for example, in RAM 112) indicating that LFU is to be performed. In step 306, the LFU control 222 initiates LFU in response to the LFU flag, and transfers LFU process control to the SCI kernel 208 within the bootloader portion 204. The portions of the SCI kernel 208 and the flash API 210 that participate in the LFU process are copied into RAM 112 during device restart and during LFU, and are executed from RAM 112 during LFU. References to the SCI kernel 208 and the flash API 210 are references to these copies in RAM 112. This is handled by step 313, which is further described below.

In step 308, the SCI kernel 208 receives a new application image from the host 104, and write the new application image to RAM 112. For example, the new application image is received in chunks and stored in RAM 112 before being written to flash bank 0 202a. In step 310, the SCI kernel 208 causes the flash API 210 to erase the old application image within the application portion 206, and to read the new application image from RAM 112 and write it to the application portion 206 in flash bank 0 202a.

In step 312, directly after step 310, execution control is passed from the bootloader portion 204 to the application LFU entry point 216 (part of the new application image). For example, a branch instruction in the bootloader 204 can be used to direct execution to a fixed memory address in the application portion 206 of flash bank 0 202a where the start of the application LFU entry point 216 is located. Executing the application LFU entry point 216 directly after copying the new application image into the application portion 206 enables LFU to be performed without device reset of the IC 102. In some examples, an ordinary transfer of control from the bootloader portion to the application portion includes (proceeds via instructions causing) a device reset. Here, directly after means that transfer of control from the bootloader portion to the application portion, entering the application portion at the application LFU entry point 216, does not include (proceed via instructions causing) a device reset, and LFU completes without a device reset.

In step 313, the portions of the SCI kernel 208 and the flash API 210 that participate in the LFU process, and the ISRs and other portions of the new application image that can be executed during the LFU process, are copied into RAM 112. New application image components are copied into RAM 112 to facilitate a next LFU process, in which the new application image will be replaced by another new (newer) application image. The copy of old application image components in RAM 112 corresponds to performance of step 313 as part of execution of the application LFU entry point 216 during a previous LFU, or to execution of the normal application entry point 218 (for example, during a device restart).

In step 314, the application LFU entry point 216 causes new variables specified by the new application image to be initialized in RAM 112 while interrupts remain enabled. (Variable states 404 used by ISRs are located in RAM 112.) As a condition of enabling single flash bank 202 LFU without device reset, new variable initialization is done without resetting or otherwise changing variables used by both the new and old application images, or other variables used by the old application image. Put differently, newly specified variables are initialized, and previously specified variables are left alone, to enable LFU to proceed and complete without device reset; leaving alone variables used by both the old and new application images does not affect the new application image's ability to respond to interrupts after LFU concludes. Also, this differentiated treatment of variables enables the ISRs in RAM 112 corresponding to the old application image to remain available for execution during LFU. Data constants are stored in flash bank 0 202a as part of the application image. To the extent data constants are required for ISR execution, data constants are copied to RAM 112 when the application LFU entry point 216 copies to RAM 112 ISRs and other components in the bootloader and application portions 204 and 206 required for ISR functional reliability and for LFU (as described with respect to FIG. 2). Steps 302 through 314 can be performed while interrupts remain enabled and regardless of interrupt response activity, including rising and falling edges of interrupt response load. In some examples, the CPU 108 can only perform one task at a time, and accordingly, steps 313 and 314 are respectively started while the CPU 108 is not engaged in responding to an interrupt (such as between T1 and T2, or between T4 and T5, as shown in and described below with respect to FIG. 5), but can be suspended during interrupt response and returned to after interrupt response concludes.

In step 316, the application LFU entry point 216 waits until it identifies the end of an ISR, and disables interrupt response throughout the IC 102 and moves to step 318 once the ISR terminus has been identified. For example, ISRs running from RAM 112 set an ISR_end_flag variable to a first logical value when the ISR begins executing, and set the ISR_end_flag variable to a second logical value when the ISR finishes executing. The application LFU entry point 216 waits until the ISR_end_flag variable has the second logical value to disable interrupt response and move to step 318.

In step 318, under control of the application LFU entry point 216, the stack is initialized, interrupt vectors are updated, and function pointers are updated, in any relative order. This means that any of stack initialization, interrupt vector updating, and function pointer updating can be executed first, second, or third within step 318; or one or more of these can be executed partially or entirely in parallel, if this is an available option. The stack, interrupt vector, and function pointer(s) 406 are located in RAM 112. Step 318 is relatively short compared to step 314 (and, in some examples, relatively short compared to periods between interrupts). Accordingly, the ISR_end_flag check performed by step 316 times step 318 to be performed when no interrupt is being handled by the IC 102. Interrupt response is disabled during step 318 because performing an interrupt response, which causes an interrupt vector read to determine a memory location of a corresponding ISR, can cause unexpected behavior if interrupt vectors are being updated at the same time as the interrupt response process is executing; similar issues can occur as a result of stack checks and function calls (which call functions as memory locations specified by function pointers). Accordingly, because of the timing orchestrated by step 316, step 318 does not disrupt interrupt response in process, and step 318's brevity means that any delay in interrupt response will be short. After step 318 is complete, in step 320, interrupt response is re-enabled. Subsequent interrupts corresponding to ISR(s) in the new application image will result in execution of new application image code.

Accordingly, LFU is enabled using a single flash bank 202 and without performing a device reset. This enables cost and device area efficiency, reducing (by up to half) the number of flash banks required to store application firmware that can be updated using LFU. Further, LFU using a single flash bank 202 enables simpler flash update software, because update code can be written that does not require specifying different flash banks as storing the old application image and receiving the new application image.

If an exception (software or hardware error) occurs during an LFU, a device reset may or may not be required. If a device reset is performed, once reboot functions are completed and execution returns to performing the LFU, execution begins in the bootloader portion 204 with an image check function. The image check function determines whether a valid application image exists in the application portion 206. This determination can be made by, for example, reading a specified location in flash bank 0 202a to check for a status indicator and an application version number. If the image check function determines that a valid application image exists in the application portion 206, it branches to the normal application entry point 218. If the image check function determines that there is not a valid application image in the application portion 206, the image check function waits for the host 104 to send a command to program a valid application image into application portion 206 of flash bank 0 202a.

If a device reset is not performed, execution depends on whether the new application image was properly written to the application portion 206; accordingly, both erase and write actions were completed successfully (passed). If the new application image was properly written to the application portion 206, the bootloader portion 204 updates the status indicator and the application version number, then directly after transfers execution control to the application LFU entry point 216. If the new application image was not properly written to the application portion 206, the bootloader portion 204 executes the image check function and the process proceeds as described above with respect to the image check function.

Figure 5:
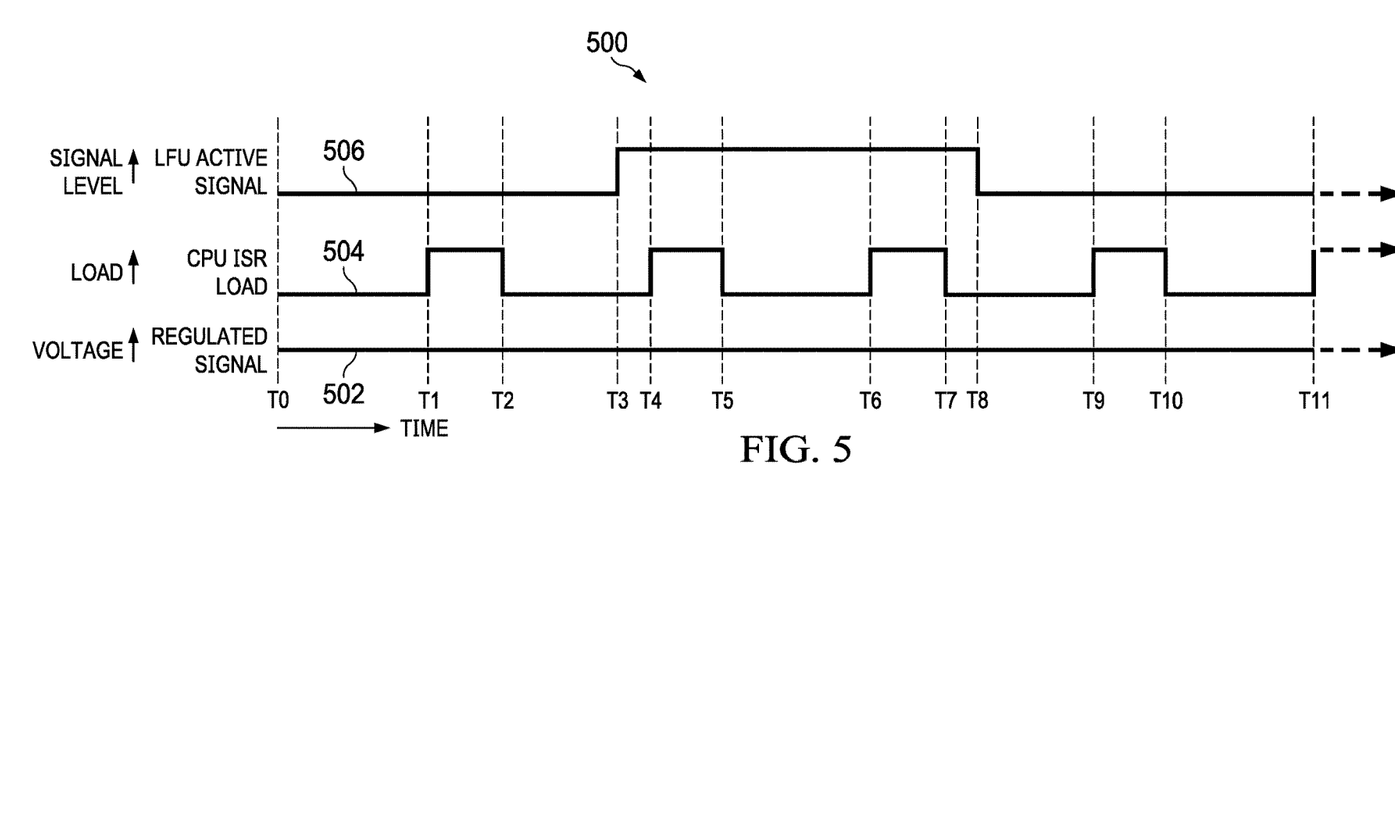
FIG. 5 shows various graphs illustrating example process and signal activity of the processing system of FIG. 1.

FIG. 5 shows various graphs 500 illustrating example process and signal activity of the processing system 100 of FIG. 1. A regulated signal 502 line shows a signal regulated by the execution ISR 215 of flash bank 0 202a. The regulated signal 502 shows no discontinuities or unwanted variations (accordingly, no periods when interrupt response fails to maintain signal output and regulation) throughout an LFU process. A CPU ISR load 504 line shows load in the CPU 108 corresponding to interrupts handled by the execution ISR 215 of flash bank 0 202a. When interrupt handling begins for a particular interrupt, CPU ISR load 504 shows a rising edge. When interrupt handling ends for the particular interrupt, CPU ISR load 504 shows a falling edge. Accordingly, interrupts are handled between T1 and T2, between T4 and T5, between T6 and T7, and between T9 and T10. An LFU active 506 status line indicates the state of a status signal; the signal has a high-level state (higher level on the vertical axis) while steps 313, 314, 316, 318, and 320 are being performed. That is, prior to T3 (where LFU active status 506 shows a rising edge, indicating the beginning of step 313), the new application image is received by the SCI kernel 308, the old application image located in flash bank 0 202a is erased, and the application portion 206 of flash bank 0 202a is reprogrammed to contain the new application image. Starting at T3—in this example, between the interrupt response that concludes at T2 and prior to the interrupt response that begins at T4—components of the bootloader portion 204 and the application portion 206 (which contains the new application image) that can or are required to be performed during LFU are copied into RAM 112 (step 313), and variable initialization (step 314) is performed, initializing new variables present in the new application image while leaving old variables present in both the old and new application images unaffected. Performance of steps 313 and 314 can be actively performed between T3 and T4, and between T5 and T6. Between T7 and T8, steps 316, 318, and 320 are performed. After T8, background tasks performed according to the application portion 206 can resume, and do so according to the new application image.

Modifications are possible in the described embodiments, and other embodiments are possible, within the scope of the claims.

In some examples, RAM 112 is faster than flash memory 202.

In some examples, only portions of the old application image necessary to be run during steps 310, 312, and 314 are copied to RAM 112.

In some examples, only those portions of the application image that could be triggered during an interrupt event are copied to RAM 112; in some examples, a larger portion or all of the application image is copied to RAM 112.

In some examples, the old application image is copied to RAM 112 after application image initialization begins, such as after an LFU command has been received. In some examples, the application LFU entry point 216 is not executed after a device reset; for example, the normal application entry point 218 may be executed instead. In some examples, the application LFU entry point 216 is executed prior to or at the start of LFU to copy the old application image to RAM 112 (in addition to execution of the application LFU entry point 216 after return of process control from the bootloader portion 204 to the application portion 206).

In some examples, a shadow vector table is used. In some examples, updating an interrupt vector means the shadow vector table is updated prior to execution of the application LFU entry point, and the application LFU entry point 216 designates the shadow vector table as the execution-use vector table and designating the old execution-use vector table as the shadow vector table (swapping designations of the shadow vector table and the execution-use vector table).

In some examples, the portion of the SCI kernel 208 associated with the flash API 210 is the portion of the SCI kernel 208 that waits in loop while the flash API 210 executes.

In some examples, other memory use approaches than those described above are implemented with respect to post-LFU ISR- and LFU-related components corresponding to an old application image superseded, via LFU, by a new application image.

In some examples, RAM 112 memory locations used by variables corresponding to an old application image and not to a new application image will remain unchanged, and not in active use, after LFU completes. In some examples, other memory use approaches, such as dynamic memory allocation, can be used to improve RAM 112 utilization efficiency.

In some examples, one or more ISRs that do not run during LFU are run from flash bank 0 202a (rather than from RAM 112).

In some examples, other methods of determining when interrupt response is not active other than those described above are used to find an idle window during which to begin variable initialization, and to find an idle window during which to begin stack, interrupt vector, and function pointer updating.

In some examples, multiple CPUs 108 or multiple flash banks 202 can be involved in an LFU.

In some examples, performance of step 316 does not commence until an ISR response completes. In some examples, performance of step 316 commences while ISR response is not being performed.

In some examples, a communication protocol other than SCI, such as controller area network (CAN) or Ethernet, is used.

What is claimed is:

1. A method comprising:
performing a live firmware update (LFU) of a single memory bank in an integrated circuit (IC) using the single memory bank without power reset of the IC between receipt by the IC of a command to perform the LFU and a re-enabling of interrupt response after the LFU;
wherein performing the LFU comprises:
receiving, using a memory bank, first instructions to be executed by a processor to perform an interrupt service routine;
writing the first instructions to an application portion of the memory bank to replace second instructions previously stored by the memory bank;
executing the first instructions to perform the following steps in order:
in a first step, while maintaining an interrupt response, initializing a variable specified by the first instructions and not specified by the second instructions, and not changing a variable specified by the first instructions;
in a second step, after determining that there is no interrupt response in process, disabling the interrupt response and proceeding to a third step:
in the third step, initializing a stack used to save and restore context, updating an interrupt vector, and updating a function pointer; and
in a fourth step, re-enabling the interrupt response.

2. A memory bank of a memory, the memory bank comprising:
an application portion storing a first set of first instructions configured to be executed by a processor to perform a first interrupt service routine; and
a bootloader portion storing second instructions configured to be executed by the processor to:
cause the memory bank to receive a second set of first instructions configured to be executed by the processor to perform a second interrupt service routine that is the same as or different from the first interrupt service routine;
cause the memory bank to write the second set of first instructions to replace the first set of first instructions; and
execute the second set of first instructions to perform the following steps in order:
in a first step, while maintaining an interrupt response, initialize a variable specified by the second set of first instructions and not specified by the first set of first instructions, and not change variables specified by the first set of first instructions;
in a second step, after determining that there is no interrupt response in process, disable the interrupt response and proceed to a third step;
in the third step, initialize a stack used to save and restore context, update an interrupt vector, and update a function pointer; and
in a fourth step, re-enable the interrupt response.

3. The memory bank of claim 2, wherein the second instructions are configured to be executed by the processor to, directly after the second instructions cause the memory to write the second set of first instructions to replace the first set of first instructions in the application portion, cause the second set of first instructions to be executed by the processor to perform the first, second, third, and fourth steps in order.

4. The memory bank of claim 2, wherein the second instructions and the second set of first instructions are configured to be executed without performing a device reset.

5. The memory bank of claim 2, wherein the second set of first instructions are configured to be executed by the processor to, in another step, cause the memory bank to copy a portion of the second set of first instructions to a random access memory (RAM).

6. The memory bank of claim 5, wherein the second set of first instructions are configured to be executed by the processor to perform the another step during a device reset of the processor or after the receive the second set of first instructions action and prior to the fourth step.

7. The memory bank of claim 5, wherein an old application image within the application portion includes at least portions of the first set of first instructions required to maintain interrupt response.

8. The memory bank of claim 5, wherein an old application image within the application portion includes at least portions of the second instructions required to perform the receive the second set of first instructions action, the write the second set of first instructions action, and the execute the second set of first instructions action.

9. The memory bank of claim 5, wherein the second instructions are configured to cause the second set of first set of instructions to be written to the RAM prior to the execute the second set of first instructions action.

10. The memory bank of claim 2, wherein the first set of first instructions is configured to be executed by the processor to determine whether a live firmware update (LFU) command has been received, and to cause process control to transfer to the second instructions in response to determining that the LFU command has been received.

11. The memory bank of claim 2, wherein the memory bank is a flash memory bank.

12. An integrated circuit (IC) comprising:
a memory including a memory bank; and
a processor configured to receive a command from a host to cause the processor to execute instructions on the memory bank to perform a live firmware update (LFU) of the memory bank;
the memory bank including:
an application portion storing a first set of first instructions configured to be executed by the processor to perform an interrupt service routine; and
a bootloader portion storing second instructions configured to be executed by the processor to:
cause the memory bank to receive a second set of first instructions from the host, via the processor, in response to the command, the second set of first instructions configured to be executed by the processor to perform the interrupt service routine;
cause the memory bank to write the second set of first instructions to replace the first set of first instructions; and
execute the second set of first instructions to perform the following steps in order:
in a first step, while maintaining an interrupt response, initialize a variable specified by the second set of first instructions and not specified by the first set of first instructions, and not change variables specified by the first set of first instructions;
in a second step, after determining that there is no interrupt response in process, disable the interrupt response and proceed to a third step;

in the third step, initialize a stack used to save and restore context, update an interrupt vector, and update a function pointer; and in a fourth step, re-enable the interrupt response.

13. The IC of claim 12, wherein the second set of instructions are configured to be executed by the processor to, directly after the second set of instructions cause the memory to write the second set of first instructions to replace the first set of first instructions in the application portion, cause the second set of first instructions to be executed by the processor to perform the first, second, third, and fourth steps in order.

14. The IC of claim 12, wherein the second instructions and the second set of first instructions are executed without performing a device reset of the IC.

15. The IC of claim 12, further including a random access memory (RAM), wherein the second set of first instructions are configured to be executed by the processor to, in another step, cause the memory bank to copy a portion of the second set of first instructions to the RAM.

16. The IC of claim 15, wherein the second set of first instructions are configured to be executed by the processor to perform the another step during a device reset of the processor, or after the receive a second set of first instructions action and prior to the fourth step.

17. The IC of claim 15, wherein an old application image within the application portion includes at least portions of the first set of first instructions required to maintain interrupt response.

18. The IC of claim 15, wherein an old application image within the application portion includes at least portions of the second instructions required to perform the receive the second set of first instructions action, the write the second set of first instructions action, and the execute the second set of first instructions action.

19. The IC of claim 15, wherein the second instructions are configured to cause the second set of first set of instructions to be written to the RAM prior to the execute the second set of first instructions action.

20. The IC of claim 12, wherein the first set of first instructions is configured to be executed by the processor to determine whether the LFU command has been received, and to cause process control to transfer to the second instructions in response to determining that the LFU command has been received.

* * * * *